United States Patent [19]

Wagener et al.

[11] 4,235,624

[45] Nov. 25, 1980

[54] METHOD FOR PROCESSING COKE OVEN GAS

[75] Inventors: Dietrich Wagener; Claus Flockenhaus, both of Essen; Joachim F. Meckel, Heiligenhaus, all of Fed. Rep. of Germany

[73] Assignee: Didier Engineering GmbH, Essen, Fed. Rep. of Germany

[21] Appl. No.: 928,468

[22] Filed: Jul. 27, 1978

[30] Foreign Application Priority Data

Jul. 27, 1977 [DE] Fed. Rep. of Germany ....... 2733785

[51] Int. Cl.$^3$ .............................................. C22B 5/12
[52] U.S. Cl. ..................................... 75/91; 48/197 R; 75/35; 201/41; 252/373
[58] Field of Search ..................... 48/197 R, 212, 215, 48/210; 252/373; 75/34, 35, 91; 201/14, 15, 27, 41, 4

[56] References Cited

U.S. PATENT DOCUMENTS

| | | | |
|---|---|---|---|
| 2,379,423 | 7/1945 | Cape et al. ............................. | 75/35 |
| 3,451,896 | 6/1969 | Schon ..................................... | 201/27 |
| 3,709,669 | 1/1973 | Marion et al. ........................ | 48/215 |
| 3,846,095 | 11/1974 | Crouch ................................. | 252/373 |
| 3,866,411 | 2/1975 | Marion et al. ........................ | 48/215 |
| 3,907,703 | 9/1975 | Marlon .................................. | 252/373 |
| 4,002,534 | 1/1977 | Rammler et al. ..................... | 201/27 |

FOREIGN PATENT DOCUMENTS

885673 12/1961 United Kingdom ....................... 201/27

*Primary Examiner*—Raymond N. Jones
*Assistant Examiner*—George C. Yeung
*Attorney, Agent, or Firm*—Wenderoth, Lind & Ponack

[57] ABSTRACT

Hot coke oven gas is subjected, immediately after the discharge thereof from coke ovens, and without any preliminary cooling operation, to partial oxidation and cracking with an oxygen-containing gas, thereby forming a hot cracked gas rich in carbon monoxide and hydrogen. The hot coke oven gas may be subjected to a desulfurization operation prior to the partial oxidation and cracking Alternatively, the hot cracked gas may be subjected to a desulfurization operation after the partial oxidation and cracking. When the coke ovens are part of an overall metallurgical installation which includes an air separation and dissociation plant for obtaining substantially pure oxygen, the oxygen-containing gas employed in the partial oxidation and cracking may comprise oxygen enriched gas which is taken from an intermediate stage of the air separation and dissociation plant.

13 Claims, 1 Drawing Figure

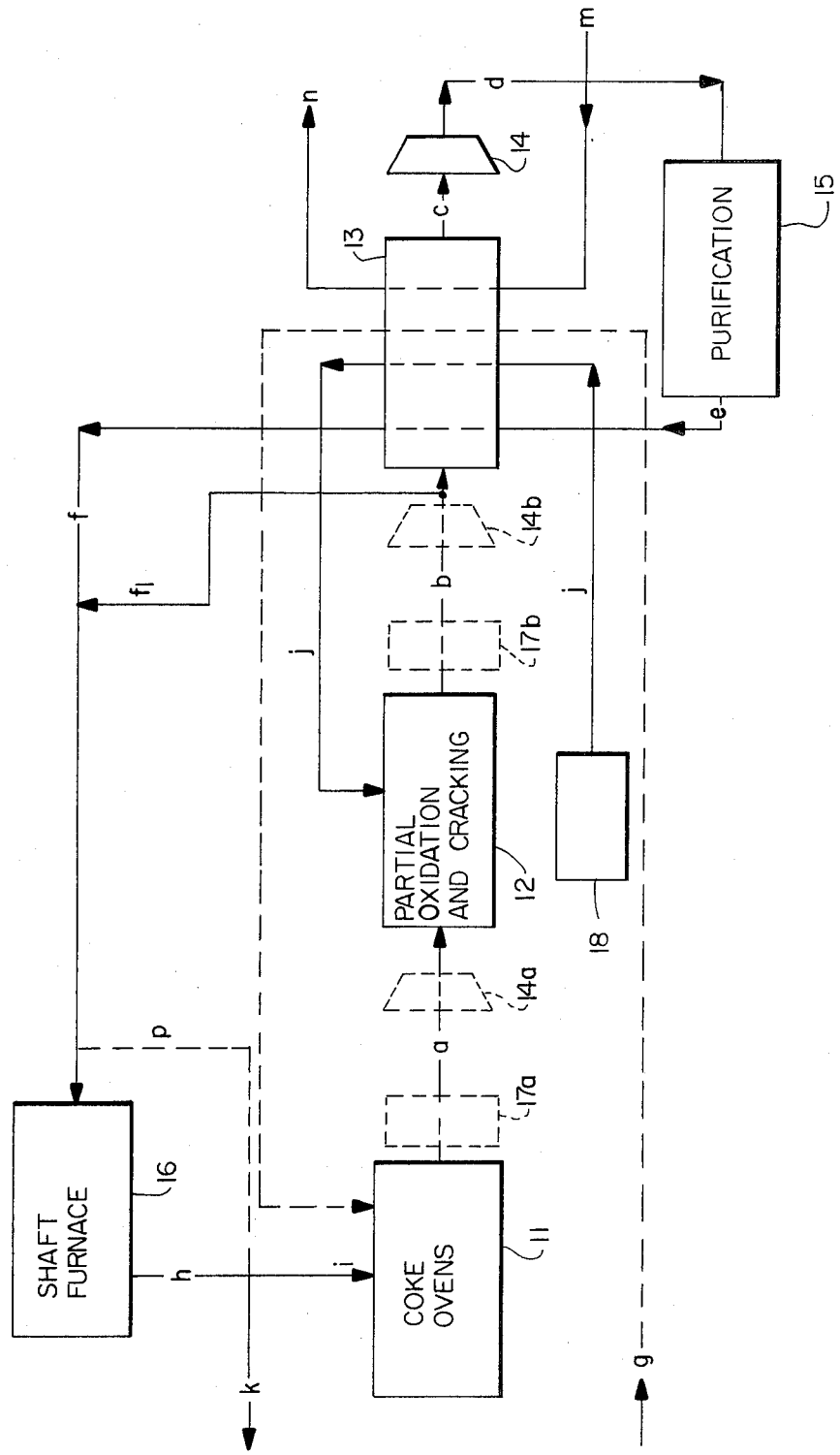

METHOD FOR PROCESSING COKE OVEN GAS

BACKGROUND OF THE INVENTION

The present invention relates to a process for processing, treating and utilizing coke oven gas.

German Application No. P 26 38 348.2, corresponding to U.S. patent application Ser. No. 827,809, filed Aug. 25, 1977, discloses a method for processing coke oven gas, wherein the hot coke oven gas from a coke oven battery is subjected directly, i.e. without any preliminary cooling, to partial oxidation and cracking by means of an oxygen-containing gas, for example oxygen, oxygen enriched air, or other oxygen-containing gas mixtures to thereby transform the hot coke oven gas into a hot cracked gas which is rich in carbon monoxide and hydrogen. The hot cracked gas is particularly useful as a reduction gas in a shaft furnace for the direct reduction of iron ore.

SUMMARY OF THE INVENTION

It is a primary object of the present invention to provide an improved method for processing coke oven gas, and specifically to improve the feasibility and economy of producing cracked gas to be used in a shaft furnace for the direct reduction of iron ore.

It is a further object of the present invention to provide such an improved method which economizes the operation of an overall metallurgical installation.

The above objects are achieved in accordance with one feature of the present invention by subjecting the hot coke oven gas to a desulfurization operation prior to the partial oxidation and cracking operation, or alternatively by subjecting the hot cracked gas to a desulfurization operation after the partial oxidation and cracking operation. Thereby, the cracked gas may be directly supplied to the shaft furnace at the specific temperature required therein for the reduction of iron ore. More particularly, the partial oxidation and cracking operation is regulated such that the temperature of reaction thereof will ensure that the hot cracked gas, upon entry into the shaft furnace, will have the exact temperature required for the direct reduction. It will of course be necessary to take into account various heat losses occurring during transfer of the hot cracked gas.

In accordance with a further feature of the present invention, either the hot coke oven gas or the hot cracked gas may be subjected to a compression operation. This is particularly desirable when the cracked gas is to be directly supplied as a reduction gas to the shaft furnace.

In accordance with a further feature of the present invention, when the coke ovens are part of an overall metallurgical installation, for example for the manufacture of steel, which includes an air separation and dissociation plant for obtaining substantially pure oxygen for use in the metallurgical installation, then the oxygen-containing gas employed in the partial oxidation and cracking operation is oxygen enriched gas which is taken from an intermediate stage of the air separation and dissociation plant of the metallurgical installation.

More particularly, as is common in overall metallurgical installations, for example for the manufacture of steel or alloys, the steel manufacturing operation requires the use of substantially pure oxygen, for example oxygen having a purity of approximately 99.5%. Metallurgical plants conventionally include an air separation and dissociation plant for treating air or other gases to obtain such substantially pure oxygen for use in the manufacture of the steel or alloys.

It will be understood that in an overall metallurgical installation including reduction furnaces, coke manufacturing facilities, and steel or alloy manufacturing facilities, it would be logical and desirable to have a single oxygen production unit for manufacturing oxygen which is necessary for use in all of the facilities of the overall installation. This is true since by employing a single large oxygen production unit, the overall unit cost for the production of oxygen would be reduced.

However, as indicated above, for the manufacture of steel or alloys it is required that the oxygen employed therein be substantially pure, for example having an oxygen purity of approximately 99.5%. However, the oxygen-containing gas employed in the partial oxidation and cracking operation need not be of such a purity, and may in fact be of a purity of from approximately 95 to 90%, or even less. Accordingly, it has not been feasible to employ a single oxygen production unit which produces very pure oxygen for all operations within the overall metallurgical plant. That is, it is not optimally economical to use substantially pure oxygen in the partial oxidation and cracking operation, since such operation may be quite satisfactorily achieved employing a gas having a substantially lower oxygen content.

Therefore, in accordance with a further feature of the present invention, the oxygen-containing gas which is employed in the partial oxidation and cracking operation is an oxygen-containing and enriched gas which is withdrawn from an intermediate stage of the air separation and dissociation plant which is provided in the overall metallurgical installation. That is, in accordance with the present invention, it is possible to withdraw from the air separation and dissociation plant an oxygen-containing gas which has a purity which is fully sufficient and economically acceptable for performing the partial oxidation and cracking operation to produce a hot cracked gas which is satisfactory for use as a reduction gas in a shaft furnace for the direct reduction of iron ore.

Therefore, it will be apparent that as a result of this feature of the present invention, the provision and operation of the overall metallurgical installation are economized. That is, by employing a single air separation and dissociation plant for the production not only of substantially pure oxygen for the manufacture of steel or other alloys, but also for the production of a less pure oxygen employable in the manufacture of reduction gas for the direct reduction of iron ore, it is possible to avoid the necessary capital cost of providing plural separate air and oxygen production units. It will further be apparent that such feature of the present invention results in a reduction in the unit cost of producing the reduction gas and the substantially pure oxygen. Additionally, this feature of the present invention, i.e. the use of an oxygen enriched air from an intermediate stage of a purified oxygen production unit, is useful for purposes other than in the direct reduction of iron ore, for example wherein the cracked gas is used for the synthesis of ammonia.

BRIEF DESCRIPTION OF THE DRAWING

Further objects, features and advantages of the present invention will be apparent from the following detailed description, with the accompanying single drawing FIGURE which is a schematic diagram illustrating preferred features of the process of the present invention.

DETAILED DESCRIPTION OF THE INVENTION

The single drawing figure schematically illustrates one possible arrangement for carrying out the method of the present invention, and specifically wherein a coke oven gas is processed to form a hot cracked gas which is employed as a reduction gas in a shaft furnace for the direct reduction of iron ore. It is specifically to be understood however that it is intended that the scope of the present invention encompass uses of the hot cracked gas for other than as a reduction gas for the direct reduction of iron ore. Specifically, it is intended that the scope of the present invention encompass the preparation of cracked gas which may be used as synthesis gas, fuel gas or other gases, wherein cracked gas is produced by subjecting coke oven gas to a partial oxidation and cracking operation, and wherein an economic desulfurization is desired or required for the further use of the cracked gas, and/or wherein the coke ovens form a portion of an overall metallurgical installation which includes a system for producing oxygen having a degree of purity higher than approximately 95%.

Furthermore, it is to be understood that the present invention is intended to be an improvement of the process disclosed in German Application No. P 26 38 348.2, corresponding to U.S. patent application Serial No. 827,809, filed Aug. 25, 1977, and the disclosures of such prior applications are herein incorporated by reference.

With reference now to the drawing, coke oven gas a comprises gas formed in coke ovens 11 during the coking of coal. Such coal may be preheated in a preheating installation (not shown). The coke oven gas a is supplied directly, and without any preliminary cooling operation, to a partial oxidation and cracking plant 12. The hot coke oven gas a is subjected within plant 12 to a partial oxidation and cracking operation by means of an oxygen-containing as j, for example oxygen, oxygen enriched air, or other oxygen-containing gas mixtures, to form a hot cracked gas b which is rich in carbon monoxide and hydrogen.

In accordance with one feature of the present invention, either the hot coke oven gas a is subjected to a desulfurization operation, as at 17a, prior to the partial oxidation and cracking operation, or alternatively the hot cracked gas b is subjected to a desulfurization operation, as at 17b, after the partial oxidation and cracking reaction. Thereby, the hot and desulfurized cracked gas may thereby be directly supplied as a reduction gas, as at $f_1$ and f, to a furnace 16 which forms with coke ovens 11 a part of an overall metallurgical installation. It is to be understood that furnace 16 may be any type of reduction furnace, such as a shaft furnace, and particularly a blast furnace into which is injected a reduction gas. Thus, the hot and desulfurized cracked gas is supplied as a reduction gas directly to shaft furnace 16 for the direct reduction therein of an ore, such as iron ore. It is specifically to be understood however that the hot and desulfurized cracked gas b could be employed for purposes other than as a reduction gas.

In accordance with a further feature of the present invention, it is possible to compress the hot coke oven gas a, as at 14a, or to compress the hot cracked gas b as at 14b. Such compression is particularly desirable when the hot cracked gas is to be supplied as a reduction gas to a shaft furnace.

In accordance with a further feature of the present invention, when the hot cracked gas is supplied directly to the shaft furnace, then it is possible to regulate the partial oxidation and cracking reaction within plant 12 to ensure that the temperature of the hot cracked gas, upon its entry into the shaft furnace 16, is precisely the temperature required for the direct reduction operation. It will of course be necessary to account for heat losses during transportation of the hot cracked gas to the shaft furnace. It is believed that those skilled in the art would understand how to so regulate the temperature of the partial oxidation and cracking operation to ensure such desired temperature of the cracked gas at the point of utilization, i.e. at the entry into the shaft furnace.

In accordance with a further feature of the present invention, the coke ovens 11 are provided as a portion of an overall metallurgical installation, such as for the manufacture of steel or other alloys, which includes an oxygen production unit, for example an air separation and dissociation plant, shown schematically in the drawing at 18. Plant 18 may be any conventional and known facility for the production of substantially pure oxygen as employed in metallurgical installations. In accordance with the present invention, an oxygen enriched gas is withdrawn from an intermediate stage of plant 18 and is employed as the oxygen-containing gas j which is used in plant 12 to carry out the partial oxidation and cracking operation. Specifically, the oxygen enriched gas j which is withdrawn from plant 18 may have an oxygen purity of 95 to 90% or less.

Although the above description is directed to a process wherein the hot cracked gas is supplied directly to a point of utilization, for example shaft furnace 16, it is intended to be within the scope of the present invention that hot cracked gas b may be further treated before being supplied to a position of utilization.

For example, hot cracked gas b leaving plant 12 at a temperature of approximately 950 to 1500 °C. may be passed through a heat exchanger 13 wherein the cracked gas is cooled to form cooled cracked gas c. The cooled cracked gas c may be subjected to compression at compression stage 14 to form a compressed cracked gas d. As indicated above, this is particularly advantageous when the cracked gas is to be used in furnace 16 as a reduction gas. The compressed cracked gas d may then be subjected to a final purification operation in purification installation 15 to thereby form purified cracked gas e. The purified cracked gas e may then be passed through heat exchanger 13 in heat exchange relation with the hot cracked gas b to form a reheated cracked gas as reduction gas f which is then supplied to furnace 16.

When the cracked gas is supplied as a reduction gas to furnace 16 used for the reduction of ore, then furnace 16 will discharge a waste gas h. A portion i of this waste gas may be employed for the undergrate firing of coke ovens 11, and a portion k of such waste gas may be discharged as excess gas for other heating purposes in the overall metallurgical installation. Additionally, a portion p of the reduction gas f or $f_1$ may similarly be removed as excess gas for other heating purposes in the overall metallurgical installation. Waste gas h leaving furnace 16 may be expected to have a heating calorific value of approximately 2000 to 2500 kcal/m³.

In accordance with a further feature of the present invention, a fuel or heating gas g may be passed through heat exchanger 13 in heat exchange relation with the hot cracked gas b and thereby be preheated. The thus preheated fuel gas g may be supplied to the coke ovens 11 as a coking gas.

The oxygen enriched gas j from the plant 18 may be passed through heat exchanger 13 in heat exchange relation with the hot cracked gas b, thereby preheating the oxygen enriched gas j to a temperature desired for the partial oxidation and cracking operation, for example to a temperature of approximately 200° C. The purified cracked gas e may be heated by heat exchange relation with the hot cracked gas b to a temperature of approximately 800° to 900° C. to thereby form the reheated cracked gas or reduction gas f. Additionally, hot cracked gas b may be cooled in heat exchanger 13 by means of a separate cooling medium m-n.

The above discussion has been with regard to specifically preferred features and embodiments of the process of the present invention. It is to be understood however that various modifications may be made to the above specifically described features without departing from the scope of the present invention.

What we claim is:

1. A method for the formation and utilization of reduction gas, said method comprising:
    forming hot coke oven gas in a coke oven and withdrawing said hot coke oven gas from said coke oven;
    subjecting said hot coke oven gas, immediately after the withdrawal thereof from said coke oven, and without any preliminary cooling operation, to partial oxidation and cracking with an oxygen-containing gas, and thereby forming a hot cracked gas rich in carbon monoxide and hydrogen;
    subjecting said hot coke oven gas before said partial oxidation and cracking or said hot cracked gas after said partial oxidation and cracking, while still hot and without any preliminary cooling operation, to a hot desulfurization operation;
    supplying the thus desulfurized hot cracked gas as a reduction gas directly to a shaft furnace for performing a direct reduction operation therein, without any preliminary cooling of said hot cracked gas, other than resulting from heat lost during transfer to said shaft furnace; and
    regulating said partial oxidation and cracking such that the temperature of said hot cracked gas, upon entry thereof into said shaft furnace, will be sufficient to achieve said direct reduction operation.

2. A method as claimed in claim 1, wherein said oxygen-containing gas comprises oxygen enriched air.

3. A method as claimed in claim 1, wherein said hot coke oven gas is subjected to said desulfurization operation.

4. A method as claimed in claim 1, wherein said hot cracked gas is subjected to said desulfurization operation.

5. A method as claimed in claim 1, further comprising compressing said hot coke oven gas prior to said partial oxidation and cracking.

6. A method as claimed in claim 1, further comprising compressing said hot cracked gas after said partial oxidation and cracking.

7. A method as claimed in claim 1, wherein said coke oven is part of an overall metallurgical installation which includes said shaft furnace and an air separation and dissociation plant for obtaining substantially pure oxygen used in said metallurgical installation, and said oxygen-containing gas comprises oxygen enriched gas of a purity less than said substantially pure oxygen and taken from an intermediate stage of said air separation and dissociation plant.

8. A method as claimed in claim 1, wherein said shaft furnace produces a waste gas, and a portion of said waste gas is supplied as an undergrate firing gas to said coke oven.

9. A method for the formation and utilization of reduction gas in an overall metallurgical installation including a coke oven, a shaft furnace and an air separation and dissociation plant for obtaining substantially pure oxygen used in said metallurgical installation, said method comprising:
    forming hot coke oven gas in said coke oven and withdrawing said hot coke oven gas from said coke oven;
    withdrawing from an intermediate stage of said air separation and dissociation plant oxygen enriched gas having a purity less than said substantially pure oxygen;
    subjecting said hot coke oven gas, immediately after the discharge thereof from said coke oven, and without any preliminary cooling operation, to partial oxidation and cracking with said oxygen enriched gas, and thereby forming hot cracked gas rich in carbon monoxide and hydrogen; and
    supplying said hot cracked gas as a reduction gas directly to said shaft furnace for performing a direct reduction operation therein, without any preliminary cooling of said hot cracked gas, other than resulting from heat lost during transfer to said shaft furnace.

10. A method as claimed in claim 9, further comprising regulating said partial oxidation and cracking such that the temperature of said hot cracked gas, upon entry thereof into said shaft furnace, will be sufficient for said direct reduction operation.

11. A method as claimed in claim 9, further comprising compressing said hot coke oven gas prior to said partial oxidation and cracking.

12. A method as claimed in claim 9, further comprising compressing said hot cracked gas after said partial oxidation and cracking.

13. A method as claimed in claim 9, wherein said shaft furnace produces a waste gas, and a portion of said waste gas is supplied as an undergrate firing gas to said coke oven.

* * * * *